(12) United States Patent
Windauer

(10) Patent No.: US 8,670,179 B2
(45) Date of Patent: Mar. 11, 2014

(54) MULTI-FUNCTION TURRET KNOB

(75) Inventor: Bernard T. Windauer, Kalispell, MT (US)

(73) Assignee: Bernard T. Windauer, Kalispell, MT (US)

( * ) Notice: Subject to any disclaimer, the term of this patent is extended or adjusted under 35 U.S.C. 154(b) by 213 days.

(21) Appl. No.: 13/133,454

(22) PCT Filed: Dec. 8, 2009

(86) PCT No.: PCT/US2009/067215
§ 371 (c)(1),
(2), (4) Date: Jun. 8, 2011

(87) PCT Pub. No.: WO2010/077691
PCT Pub. Date: Jul. 8, 2010

(65) Prior Publication Data
US 2011/0242650 A1    Oct. 6, 2011

Related U.S. Application Data

(60) Provisional application No. 61/120,783, filed on Dec. 8, 2008.

(51) Int. Cl.
*G02B 23/00*    (2006.01)
*F41G 1/38*    (2006.01)

(52) U.S. Cl.
CPC ........................................ *F41G 1/38* (2013.01)
USPC .............................. 359/428; 42/122; 42/137

(58) Field of Classification Search
None
See application file for complete search history.

(56) References Cited

U.S. PATENT DOCUMENTS

| | | | |
|---|---|---|---|
| 1,344,973 A | 6/1920 | Bader |
| 2,143,167 A | 1/1939 | Pechar |
| 2,165,796 A | 7/1939 | Humeston |
| 2,208,913 A | 7/1940 | Unertl |
| 2,229,637 A | 1/1941 | Burton |
| 2,336,107 A | 12/1943 | Litschert |
| 2,583,042 A | 1/1952 | Dayton |

(Continued)

FOREIGN PATENT DOCUMENTS

| CN | 2752794 Y | 1/2006 |
|---|---|---|
| DE | 2 148 967 | 4/1973 |

(Continued)

OTHER PUBLICATIONS

PCT/US2009/067215, International Search Report, mailed Jul. 19, 2010, 3 pages.

(Continued)

*Primary Examiner* — Derek S Chapel

(57) ABSTRACT

A turret knob comprises first and second adjustment members that are both adjustably positionable about an axis of rotation, and a slip/engagement member positioned between the first and the second adjustment members along the axis of rotation. The slip-engagement member is movable between three positions along the axis of rotation. In a first position, the slip-engagement member does not engage the first or the second adjustment members. In the second position, the slip/engagement member engages the first adjustment member to rotatably adjust only the first adjustable member about the axis of rotation as the slip/engagement member is rotated about the axis of rotation. In the third position, the slip/engagement member engages the second adjustable member to rotatably adjust only the second adjustable member about the axis of rotation.

20 Claims, 8 Drawing Sheets

(56) References Cited

U.S. PATENT DOCUMENTS

| | | |
|---|---|---|
| 2,585,933 A | 2/1952 | Harvey |
| 2,682,707 A | 7/1954 | Dahlberg |
| 2,452,592 A | 11/1958 | Meyer |
| 2,913,826 A | 11/1959 | Petty |
| 3,027,287 A | 6/1962 | Glatz et al. |
| 3,037,287 A | 6/1962 | Glatz et al. |
| 3,058,391 A | 10/1962 | Leupold |
| 3,161,716 A | 12/1964 | Burris |
| 3,222,987 A | 12/1965 | Wrigglesworth |
| 3,280,463 A | 10/1966 | Stadler |
| 3,297,389 A | 1/1967 | Gibson |
| 3,471,932 A | 10/1969 | Luning |
| 3,662,618 A | 5/1972 | Kroll et al. |
| 3,707,204 A | 12/1972 | Dussardier |
| 3,826,012 A | 7/1974 | Pachmayr |
| 3,916,721 A | 11/1975 | Egger |
| 3,962,795 A | 6/1976 | Ross |
| 3,990,155 A | 11/1976 | Akin, Jr. et al. |
| 3,999,442 A | 12/1976 | Decker et al. |
| 4,012,966 A | 3/1977 | Lieberman et al. |
| 4,026,397 A * | 5/1977 | Raus .................... 192/48.1 |
| 4,038,757 A | 8/1977 | Hicks et al. |
| 4,132,129 A | 1/1979 | Pratt |
| 4,154,125 A | 5/1979 | Frank |
| 4,200,355 A | 4/1980 | Williams, Jr. |
| 4,201,096 A | 5/1980 | Morrison et al. |
| 4,247,161 A | 1/1981 | Unertl, Jr. |
| 4,347,758 A | 9/1982 | Geil et al. |
| 4,373,269 A | 2/1983 | Doliber et al. |
| 4,389,791 A | 6/1983 | Ackerman |
| 4,408,842 A | 10/1983 | Gibson |
| 4,457,076 A | 7/1984 | Heck |
| 4,461,330 A | 7/1984 | Judkins |
| 4,643,542 A | 2/1987 | Gibson |
| 4,779,305 A | 10/1988 | Gorsek |
| 4,955,253 A | 9/1990 | Sakai et al. |
| 4,982,502 A | 1/1991 | Weyrauch |
| 5,020,389 A | 6/1991 | Sigler |
| 5,083,477 A | 1/1992 | Geil |
| 5,121,653 A | 6/1992 | Sigler |
| 5,152,187 A | 10/1992 | LaFemina |
| 5,329,829 A | 7/1994 | Sell |
| 5,363,559 A | 11/1994 | McCarty |
| 5,433,010 A | 7/1995 | Bell |
| 5,450,653 A | 9/1995 | Howie, Jr. |
| 5,499,456 A | 3/1996 | Tomita |
| 5,513,440 A | 5/1996 | Murg |
| 5,586,569 A | 12/1996 | Hanning et al. |
| 5,615,487 A | 4/1997 | Tomita |
| 5,618,374 A | 4/1997 | Byerley |
| 5,695,125 A | 12/1997 | Kumar |
| 5,715,607 A | 2/1998 | Murg |
| 5,745,287 A | 4/1998 | Sauter |
| 5,771,595 A | 6/1998 | Bell |
| 5,862,715 A | 1/1999 | Lemire |
| 5,892,617 A | 4/1999 | Wallace |
| 5,906,141 A | 5/1999 | Abdelmoula |
| 5,930,934 A | 8/1999 | Fisher et al. |
| 6,005,711 A | 12/1999 | Mai et al. |
| 6,279,259 B1 | 8/2001 | Otteman |
| 6,351,907 B1 | 3/2002 | Otteman |
| 6,442,854 B1 | 9/2002 | Lui et al. |
| 6,508,026 B1 | 1/2003 | Uppiano et al. |
| 6,508,144 B1 | 1/2003 | Vendetti et al. |
| 6,519,890 B1 | 2/2003 | Otteman |
| 6,588,125 B2 | 7/2003 | Procter, Sr. |
| 6,643,970 B2 | 11/2003 | Huber |
| 6,691,447 B1 | 2/2004 | Otteman |
| 6,705,037 B2 | 3/2004 | Van Kirk |
| 6,721,095 B2 | 4/2004 | Huber |
| 6,772,550 B1 | 8/2004 | Leatherwood |
| 6,848,628 B2 | 2/2005 | Walker |
| 6,860,442 B2 | 3/2005 | Datcuk, Jr. |
| 6,862,832 B2 | 3/2005 | Barrett |
| 7,117,624 B2 | 10/2006 | Kim |
| 7,121,037 B2 | 10/2006 | Penney |
| 7,269,920 B2 * | 9/2007 | Staley, III .................... 42/114 |
| 7,330,310 B2 | 2/2008 | Hengst et al. |
| 7,552,559 B2 | 6/2009 | Day |
| 7,612,952 B2 | 11/2009 | Schafer |
| 7,806,331 B2 | 10/2010 | Windauer et al. |
| 8,413,364 B2 * | 4/2013 | Riley .................... 42/122 |
| 2003/0140545 A1 | 7/2003 | Huber |
| 2004/0025396 A1 | 2/2004 | Schlierbach et al. |
| 2004/0088898 A1 | 5/2004 | Barrett |
| 2006/0107580 A1 | 5/2006 | Thomas et al. |
| 2006/0168871 A1 | 8/2006 | Wagner |
| 2006/0254115 A1 | 11/2006 | Thomas et al. |
| 2006/0268433 A1 | 11/2006 | Thomas |
| 2006/0278035 A1 | 12/2006 | Casas |
| 2007/0240356 A1 | 10/2007 | Klepp et al. |
| 2008/0066364 A1 | 3/2008 | Klepp et al. |
| 2008/0066384 A1 | 3/2008 | Yu |
| 2008/0236018 A1 | 10/2008 | Halverson |
| 2009/0266892 A1 | 10/2009 | Windauer et al. |
| 2011/0162250 A1 | 7/2011 | Windauer et al. |

FOREIGN PATENT DOCUMENTS

| | | |
|---|---|---|
| DE | 297 20 737 U1 | 3/1998 |
| DE | 299 03 989 U1 | 7/1999 |
| DE | 203 01 749 U1 | 6/2003 |
| DE | 102 22 528 A1 | 12/2003 |
| DE | 202006003770 U1 | 7/2006 |
| GB | 0598306 | 2/1948 |
| GB | 0 708 438 | 5/1954 |
| GB | 1 102 022 | 2/1968 |
| GB | 1 214 584 | 12/1970 |
| GB | 2 213 959 A | 8/1989 |
| JP | 10103897 A | 4/1998 |
| JP | 11085290 A | 3/1999 |
| WO | 2006/060490 A2 | 6/2006 |
| WO | 2006060489 A2 | 6/2006 |
| WO | 2006109587 A1 | 10/2006 |
| WO | 2007071930 A1 | 6/2007 |

OTHER PUBLICATIONS

PCT/US2009/067215, Written Opinion, mailed Jul. 19, 2010, 4 pages.

* cited by examiner

US 8,670,179 B2

MULTI-FUNCTION TURRET KNOB

CROSS-REFERENCE TO RELATED PATENT APPLICATION

The present patent Application is related to and claims priority to U.S. Provisional Patent Application 61/120,783, filed Dec. 8, 2008, entitled "Multi-Function Turret Knob," and to PCT Patent Application No. PCT/US2009/067215, filed Dec. 8, 2009, both of which have been invented by Bernard T. Windauer, and the disclosures of each being incorporated by reference herein.

BACKGROUND

Military and tactical operations require the utmost in accuracy and diligence on the part of an operator (or shooter or marksman) to remain focused on their task. Focusing on the task at hand requires concentration on a target that is in view through a rifle scope. Accordingly, a minimal amount of movement is necessary (i.e., to adjust sight settings) while in a shooting position (i.e., prone, sitting, kneeling, or standing) in order to remain looking through the rifle scope at the target. The ability to make sight adjustments with the hand/arm that is not being used to fire the rifle, that is, the hand/arm that is not on the trigger (i.e., the non-shooting hand), is extremely advantageous. The multi-function turret knob disclosed herein allows an operator (shooter/marksman) to make major sight adjustments (windage and elevation adjustment) and minor adjustment (parallax adjustment) with the non-shooting hand.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

Figure 1:
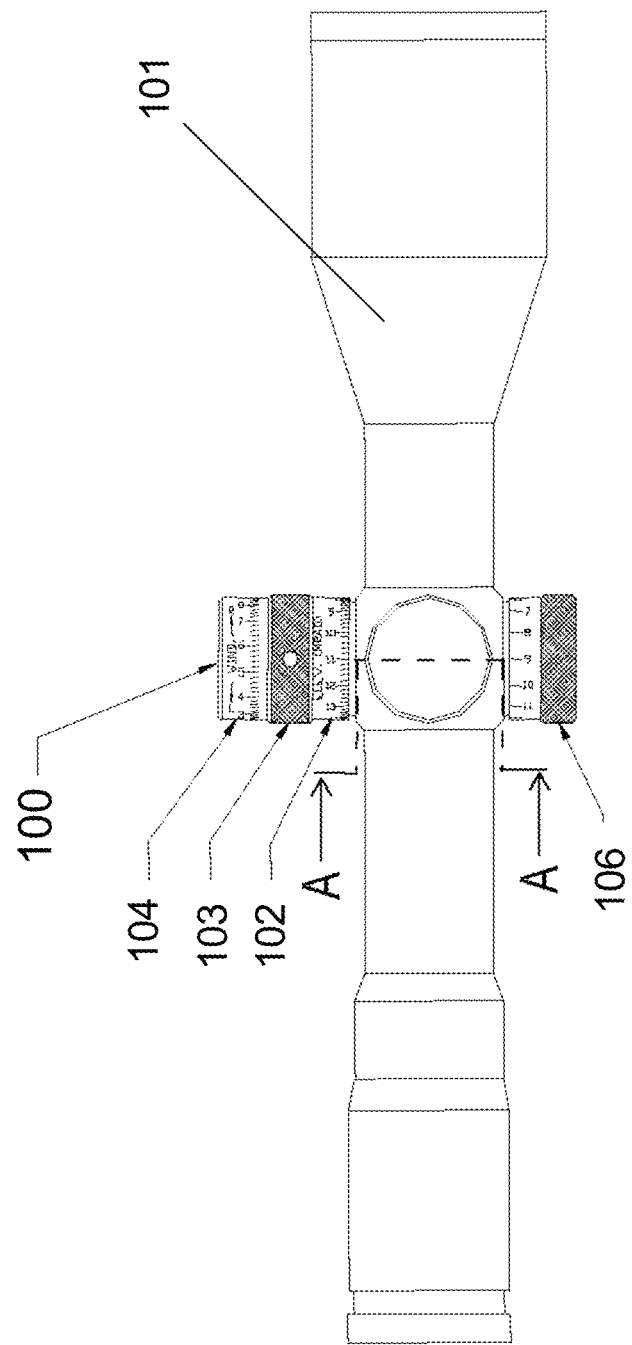
FIG. 1 shows a top view of a first exemplary embodiment of a Multi-function Turret Knob (MTK) according to the subject matter disclosed herein.
Figure 2:
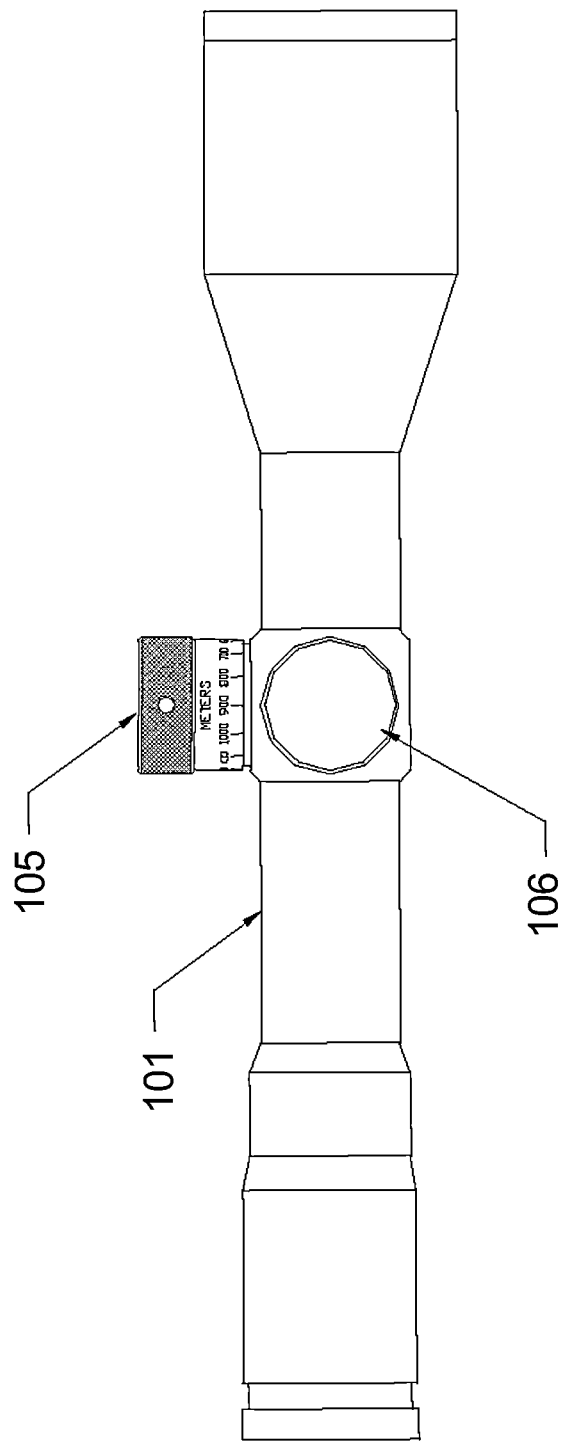
FIG. 2 shows a right side view of the first exemplary embodiment of an MTK according to the subject matter disclosed herein.
Figure 3:
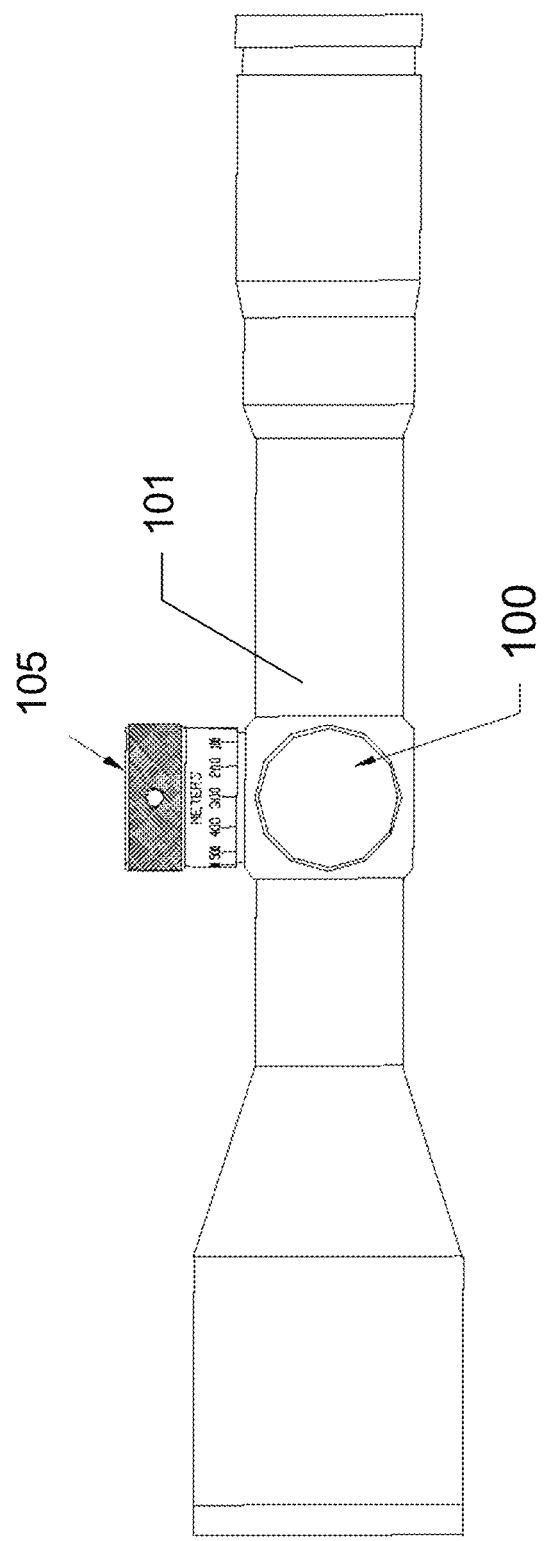
FIG. 3 shows a left side view of the first exemplary embodiment of an MTK according to the subject matter disclosed herein.
Figure 4:
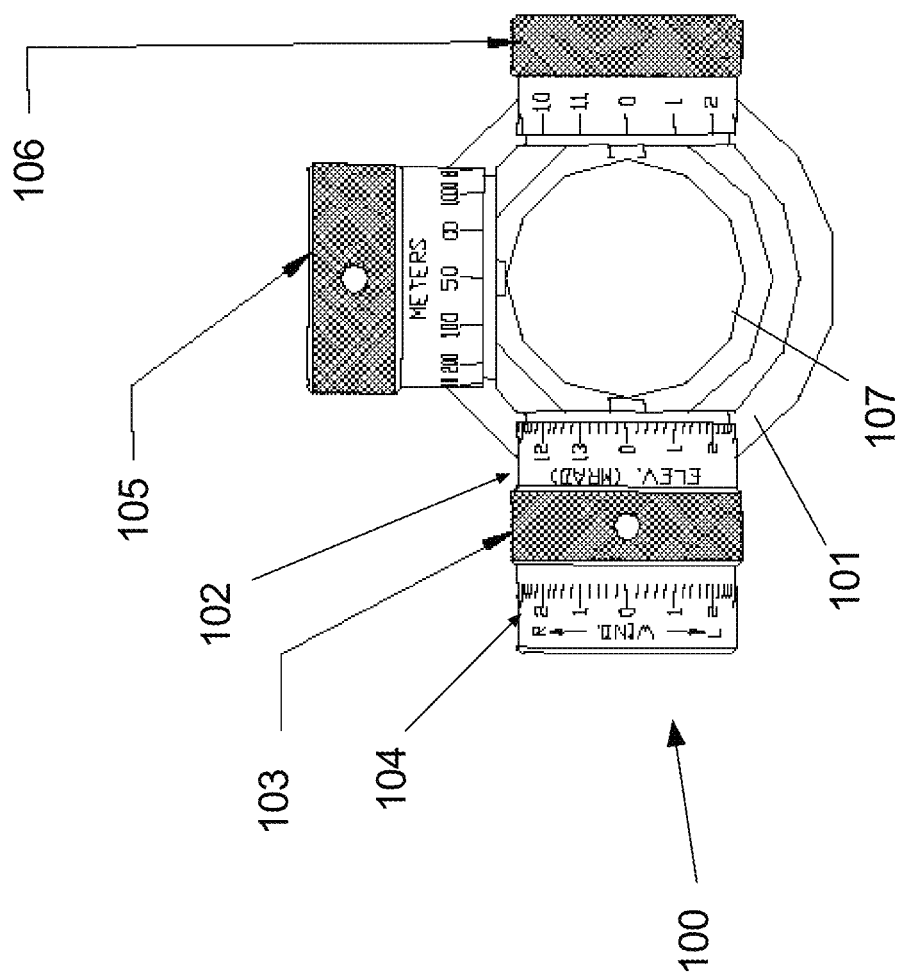
FIG. 4 shows a back end cross-sectional view of the first exemplary embodiment of an MTK taken along line A-A in FIG. 1 according to the subject matter disclosed herein.

It should be understood that the word "exemplary," as used herein, means "serving as an example, instance, or illustration." Any embodiment described herein as "exemplary" is not to be construed as necessarily preferred or advantageous over other embodiments.

According to one exemplary embodiment of the subject matter disclosed herein, a turret knob, comprises a first adjustment member adjustably positionable about an axis of rotation, a second adjustment member adjustably positionable about the axis of rotation; and a slip/engagement member positioned between the first adjustment member and the second adjustment member along the axis of rotation. The first and second adjustment members each adjust an optical adjustment of an optical scope. The slip-engagement member is movable between three positions along the axis of rotation. In a first position of the slip/engagement member, the slip-engagement member does not engage the first adjustment member or the second adjustment member. In the second position of the slip/engagement member, the slip/engagement member engages the first adjustment member to rotatably adjust the first adjustment member about the axis of rotation as the slip/engagement member is rotated about the axis of rotation and not engage the second adjustment member. In a third position of the slip/engagement member, the slip/engagement member engages the second adjustment member to rotatably adjust the second adjustment member about the axis of rotation as the slip/engagement member is rotated about the axis of rotation and not engaging the first adjustment member.

In another exemplary embodiment of the subject matter disclosed herein, the first adjustment member comprises a drum member that engages the slip/engagement member if the slip/engagement member is positioned to the second position of the slip/engagement member, and the second adjustment member comprises a drum member that engages the slip/engagement member if the slip/engagement member is positioned to the third position of the slip/engagement member. The drum member of both the first and second adjustment members engage the slip/engagement member with at least one spline, pin, or serration, or combinations thereof.

In another exemplary embodiment of the subject matter disclosed herein, the turret knob further comprises sensors capable of sensing the rotary position of the first or the second adjustment members, or combinations thereof. A reticle of the optical scope comprises a display of the sensed rotary position of the first adjustment member. The display comprises an adjustable numeric marker or a digital display of the sensed rotary position of the first and the second adjustment members, or combinations thereof.

Another exemplary embodiment of a turret knob according to the subject matter disclosed herein comprises a first adjustment member adjustably positionable about an axis of rotation, and a second adjustment member adjustably positionable about the axis of rotation. The first and second adjustment members are independently adjustable about the axis of rotation. Additionally, the first and second adjustment members each adjust an optical adjustment of an optical scope. In an alternative exemplary embodiment, the turret knob further comprises a slip/engagement member positioned between the first adjustment member and the second adjustment member along the axis of rotation. The slip-engagement member is movable between three positions along the axis of rotation. In a first position of the slip/engagement member, the slip-engagement member does not engage the first adjustment member or the second adjustment member. In a second position of the slip/engagement member, the slip/engagement member engages the first adjustment member to rotatably adjust the first adjustment member about the axis of rotation as the slip/engagement member is rotated about the axis of rotation and does not engage the second adjustment member. In a third position of the slip/engagement member, the slip/engagement member engages the second adjustment member to rotatably adjust the second adjustment member about the axis of rotation as the slip/engagement member is rotated about the axis of rotation and does not engage the first adjustment member.

FIGS. 1-4 respectively show different views of a first exemplary embodiment of a Multi-Function Turret Knob (MTK) 100 mounted on an exemplary optical rifle, or firearm, scope 101 according to the subject matter disclosed herein. MTK 100 comprises an elevation adjustment section 102, a slip/engagement ring 103, and a windage adjustment section 104. The interior construction of optical rifle scope 101 remains essentially conventional with the exception of an erector tube assembly 107 (shown in FIG. 4, but not shown in FIGS. 1-3) that is configured for operation with MTK 100. Erector tube assembly 107 is physically adjusted to provide horizontal (i.e., the windage adjustment) and vertical (elevation) adjustment of the internal aiming point of optical rifle scope 101. Erector tube assembly 107 is conventionally positioned in a horizontal direction (left or right of a centered position as viewed in FIG. 4) based on a screw-thread or helix force exerted by windage adjustment section 104 and spring-pressure counter force in opposition to the screw-thread or helix force that is provided by a spring (not shown). That is, as windage adjustment section 104 is rotated, erector tube assembly 107 is selectably positioned in a horizontal direction and thereby shifting the internal aiming point (dot or cross hair) to the left or right. It should be understood that the exact mechanical configuration providing the screw-thread or helix force and the spring-pressure counter force for the horizontal adjustment can be any of a number of well-known mechanical configurations.

Erector tube assembly 107 is positioned in a vertical direction (above or below a centered position as viewed in FIG. 4) based on one of two techniques. The first technique utilizes a horizontally oriented eccentric cam/shaft (not shown) that is located below erector tube assembly 107 as viewed in FIG. 4. The eccentric cam/shaft is rotated either directly or indirectly (i.e., through a gearing arrangement) by the externally located elevation knob section 102 of MTK 100. As the horizontal eccentric cam/shaft is rotated, a lifting force is applied to the bottom of erector tube assembly 107, thereby raising the internal aiming point (dot reticle or cross hair). It should be understood that a spring-pressure counter force is applied in a well-known manner to the top of erector tube assembly 107 by a spring (not shown). It should also be understood that the horizontal eccentric cam/shaft could be configured to be above erector tube assembly 107 as viewed in FIG. 4. Accordingly, for this alternative configuration, the spring-pressure counter force would be applied to the bottom of erector tube assembly 107.

The second technique for positioning Erector Tube Assembly 107 utilizes a pin/trunnion (not shown) that is installed on erector tube assembly 107. The pin of the pin/trunnion engages a helical groove that is formed in a rotary plate (having a horizontal axis center of rotation through the center of MTK 100) that is attached to and/or directly or indirectly rotated as elevation adjustment Section 102 of MTK 100 is rotated. As the rotary plate is rotated about its horizontal axis of rotation, the helical groove imparts a lifting force on the pin/trunnion that, in turn, lifts (or lowers) erector tube assembly 107, thereby raising (or lowering) the internal aiming point (dot reticle or cross hair).

Slip/engagement ring 103 of MTK 100 has a dual purpose. If the slip/engagement ring 103 remains centered (first position) (via a ball detent pressure), slip/engagement ring 103 is allowed to "free wheel" in the ball-detent position and, consequently, does not impart a rotational adjustment force to either elevation adjustment section 102 or windage adjustment section 104 of MTK 100. If slip/engagement Ring 103 is pushed toward elevation adjustment section 102 (second position), slip/engagement ring 103, moves from the ball-detent position, engages with splines, pins, or serrations, or combinations thereof, that are part of elevation adjustment section 102, thereby allowing rotational forces of slip/engagement ring 103 to be imparted to elevation adjustment section 102. If the force pushing slip/engagement ring 103 toward elevation adjustment section 102 is released, spring pressure provided by a spring (not shown) returns slip/engagement ring 103 to the centered ball detent position (first position). If slip/engagement ring 103 is pulled toward windage adjustment section 104 (third position), slip/engagement ring 103 moves from the ball-detent position, engages with splines, pins, or serrations, or combinations thereof, that are part of windage adjustment section 104, thereby allowing rotational forces of slip/engagement ring 103 to be imparted to windage adjustment section 104. If the force pulling slip/engagement ring 103 towards windage adjustment section 104 is released, spring pressure provided by a spring (not shown) returns slip/engagement ring 103 to the centered ball detent position (first position). Automatic return to a "centered position" may or may not be provided dependent on design.

Zeroing of adjustment sections 102 and 104 to match bullet impact locations can be accomplished using set screws in a well-known manner. Datum (bottom stop) positions can also be provided in a well-known manner as depicted in FIGS. 1-4. Also, see FIG. 7 and details described further below.

FIGS. 1-4 also depict exemplary embodiments of a parallax adjustment knob 105, and an illuminated reticle knob 106. One exemplary embodiment of a parallax adjustment knob 105 operates in a well-known manner to adjust parallax of optical rifle scope 101. One exemplary embodiment of illuminated reticle knob 106 provides user-selected illumination of a reticle (internal aiming point (dot or cross hair)) of optical rifle scope 101. Both parallax adjustment knob 105 and illuminated reticle knob 106 can optionally be included with optical rifle scope 101.

The exemplary embodiment of MTK 100 depicted in FIGS. 1-4 is configured for a left-handed operation on an optical rifle scope. It should be understood that an exemplary embodiment of an MTK could be configured for right-handed operation on an optical rifle scope.

The exemplary embodiment of MTK 100 depicted in FIGS. 1-4 shows the portions of elevation adjustment section 102 and windage adjustment section 104 on which the calibration markings are visible to be accessible to be touched. In an alternative embodiment, one or both of the elevation adjustment section 102 and the windage adjustment section 104 could be configured to be recessed with respect to the external diameters of slip/engagement ring 103 and an end of MTK 100 that is distal to optical rifle scope 101, thereby reducing the ability to contact elevation adjustment section 102 and windage adjustment section 104. In another alternative embodiment, one or both of the elevation adjustment section 102 and the windage adjustment section 104 could be covered with a suitable transparent protective covering so that a user can readily observe the calibration marking for an adjustment setting. In yet another alternative embodiment, one or both of the elevation adjustment section 102 and windage adjustment section 104 could be covered with a protective covering that comprises a window or an aperture through which a user can readily observe the calibration marking for an adjustment setting. In still another exemplary embodiment, slip/engagement ring 103 could be covered with a protective covering that comprises one or more windows or apertures through which a user can make adjustments of the elevation and windage settings of the optical rifle scope.

It is common practice for rifle/pistol scopes to have elevation, windage and parallax/focus adjustment turret knobs mounted to the outside of the scope. The rotation of the knobs advances or retracts a threaded member, or in the case of the exemplary MTK 100, a windage adjustment pin 512 or elevation adjustment pin 508 that repositions a tube assembly (erector lens assembly tube) to align the point of aim with the point of bullet impact. The term for adjusting the point of aim and point of bullet impact is "zeroing".

It is also common practice in the firearms optics industry to have index/calibration marks on the knob assembly and a fixed index mark on the scope body to give the user a point of reference for rotational movements. It is also normal practice for the user to "zero" the scope prior to normal use. To "zero" the scope the user chooses a distance where the bullet point of impact will coincide with the point of aim. This practice is accomplished by shooting the firearm at the chosen distance and measuring the distance of separation of both points. The scope aiming point adjustment knobs (windage and/or elevation) are adjusted a specific amount to make both points coincide. The firearm is again fired to verify that the adjustment of the scope aiming point adjustment knobs was adequate to have both points coincide. The knobs are then loosened from the internal mechanical assembly to align the "zero" index mark on the rotating knob with the fixed index mark on the scope body. Based on the aligning of the two marks the scope can be adjusted during use and returned to the "zero" or the base setting where the point of aim and point of bullet impact are aligned with one another.

Figure 5:
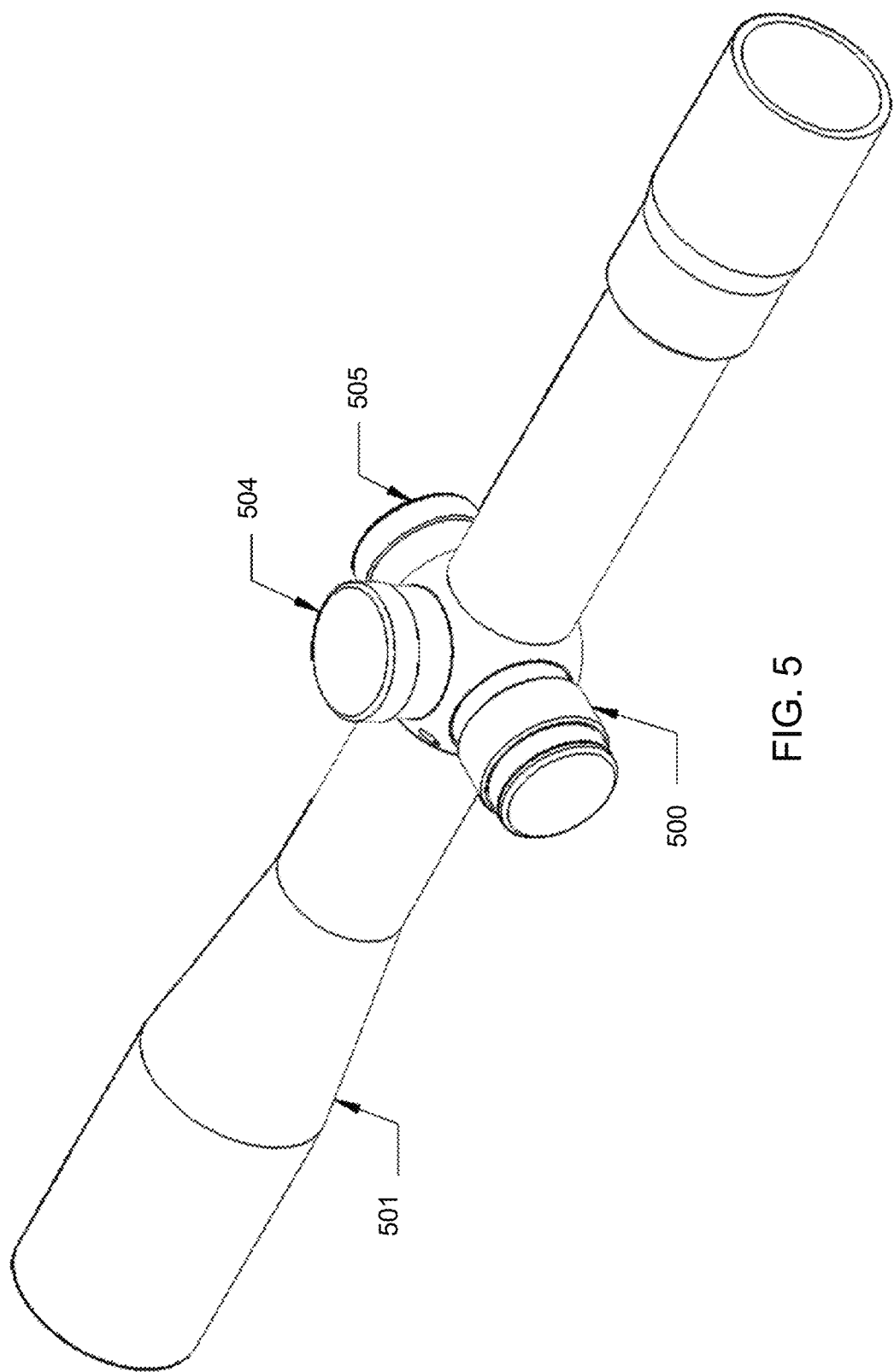
FIG. 5 shows a top left perspective view of a second exemplary embodiment of a Multi-Function Turret Knob (MTK) mounted on an exemplary embodiment of an optical rifle scope according to the subject matter disclosed herein.
Figure 6A:
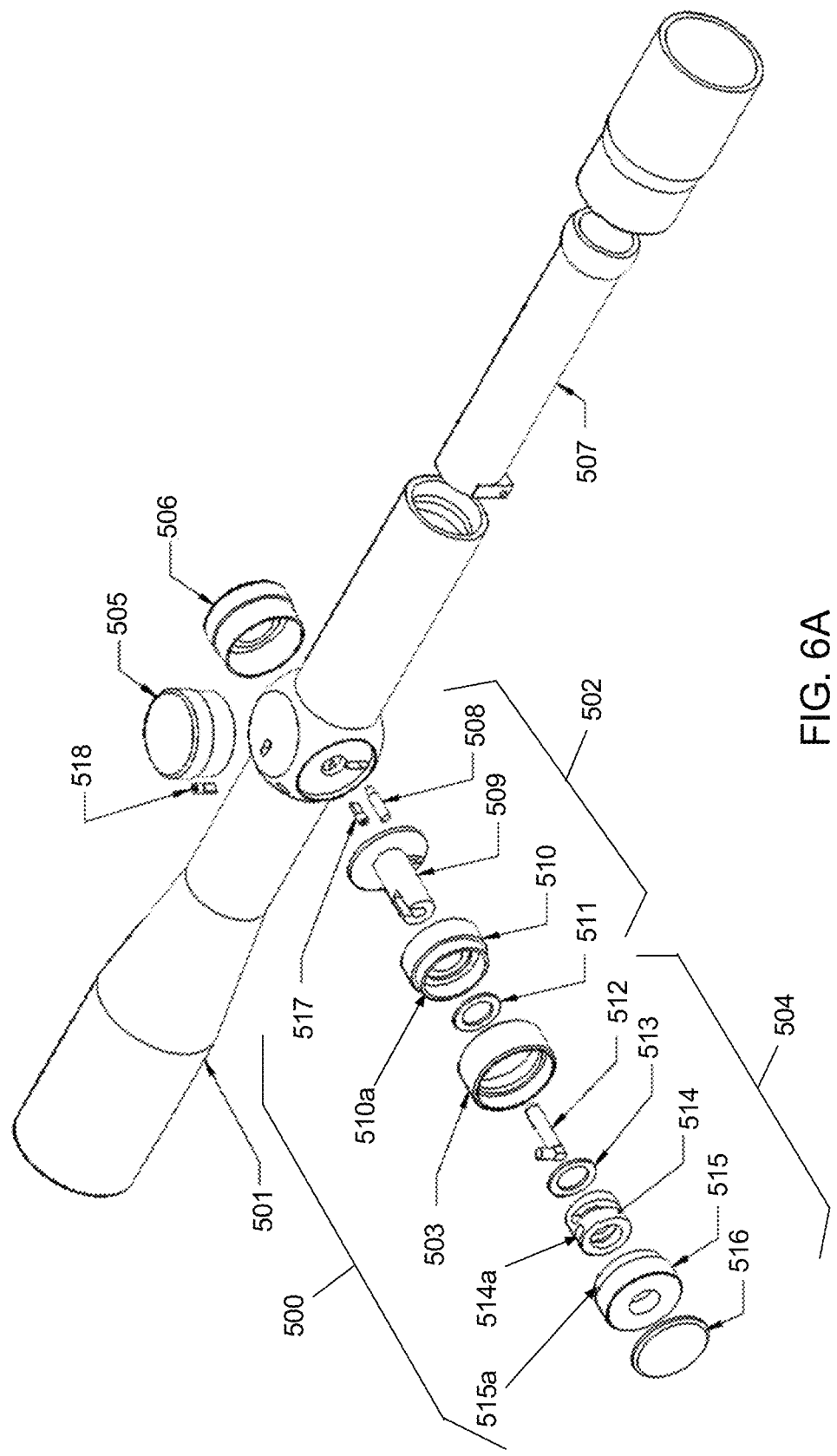
FIGS. 6A and 6B respectively show exploded top left and top right perspective views of the second exemplary embodiment of the MTK shown in FIG. 5.
Figure 6B:
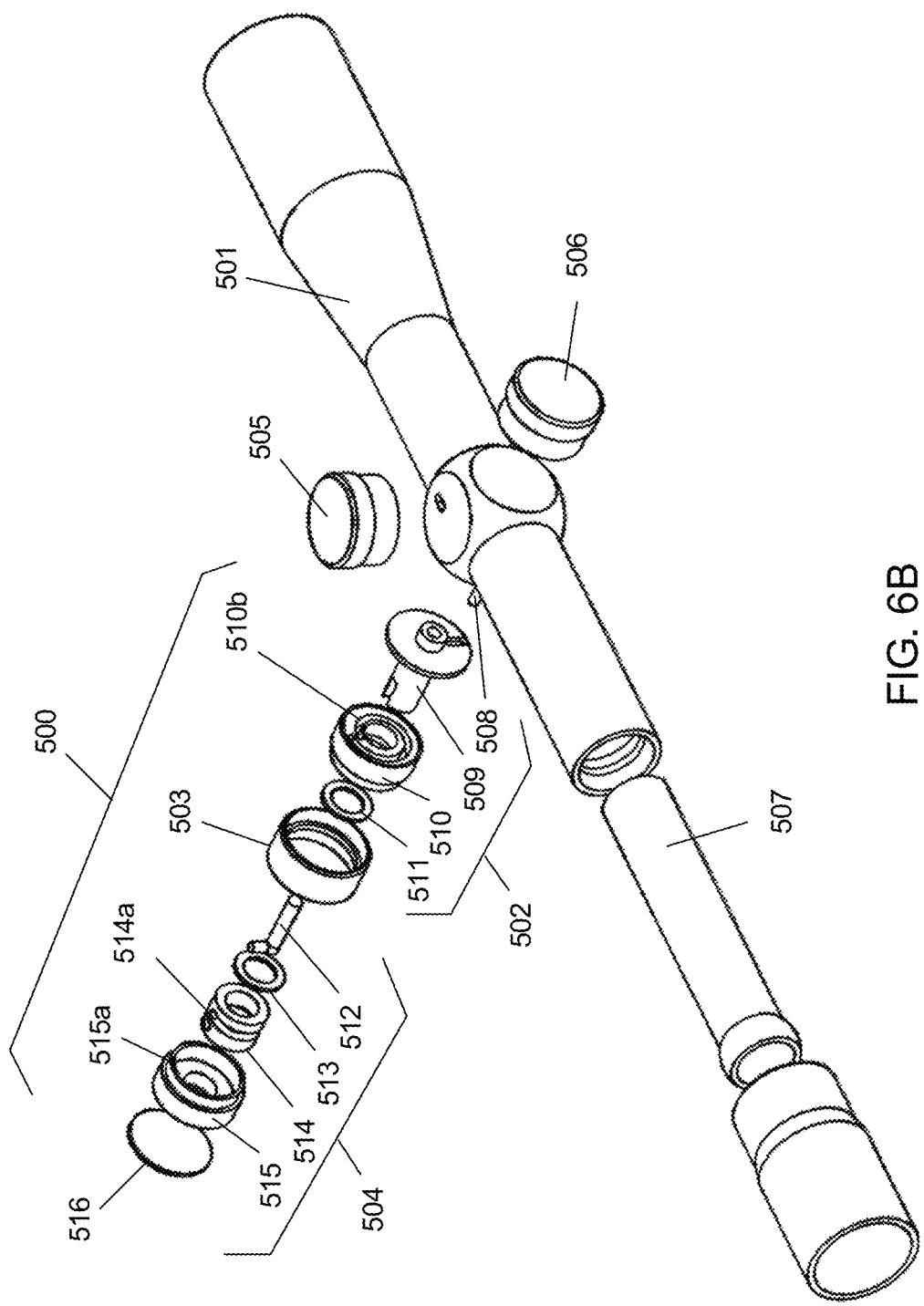

FIG. 5 shows a top left perspective view of a second exemplary embodiment of a Multi-Function Turret Knob (MTK) 500 mounted on an exemplary embodiment of an optical rifle, or firearm, scope 501 according to the subject matter disclosed herein. In particular, FIG. 5 shows a perspective view of the second embodiment of MTK 500 mounted on the exemplary embodiment of optical rifle scope 501. Also shown in FIG. 5 are a parallax adjustment knob 504, and an illuminated reticle knob 505. FIGS. 6A and 6B respectively show exploded top left and top right perspective views of MTK 500 in relationship to optical rifle scope 501.

In the exploded views of FIGS. 6A and 6B, it can be seen that MTK 500 comprises an elevation adjustment section 502, a slip/engagement ring 503, and a windage adjustment section 504. The interior construction of optical rifle scope 501 remains essentially conventional with the exception of an erector tube assembly 507 that is configured for operation with MTK 500. The front of the erector tube assembly 507 is physically adjusted to provide horizontal (i.e., the windage adjustment) and vertical (elevation) adjustment of the internal aiming point of optical rifle scope 501. Erector tube assembly 507 is conventionally positioned in a horizontal direction (left or right of a centered position as viewed in, for example, FIG. 4) by pivoting around the spherically shaped end section and based on helical slot/windage pin 512 or the conventional screw-thread force exerted by windage adjustment section 504 and spring-pressure counter force in opposition to the screw-thread force that is provided by a spring (not shown). That is, as windage adjustment section 504 is rotated, erector tube assembly 507 is selectably positioned in a horizontal direction and thereby shifts the internal aiming point (dot or cross hair) to the left or right. It should be understood that the exact mechanical configuration providing helical slot/windage pin 512 or screw-thread force and the spring-pressure counter force for the horizontal adjustment can be any of a number of well-known mechanical configurations.

Figure 7:
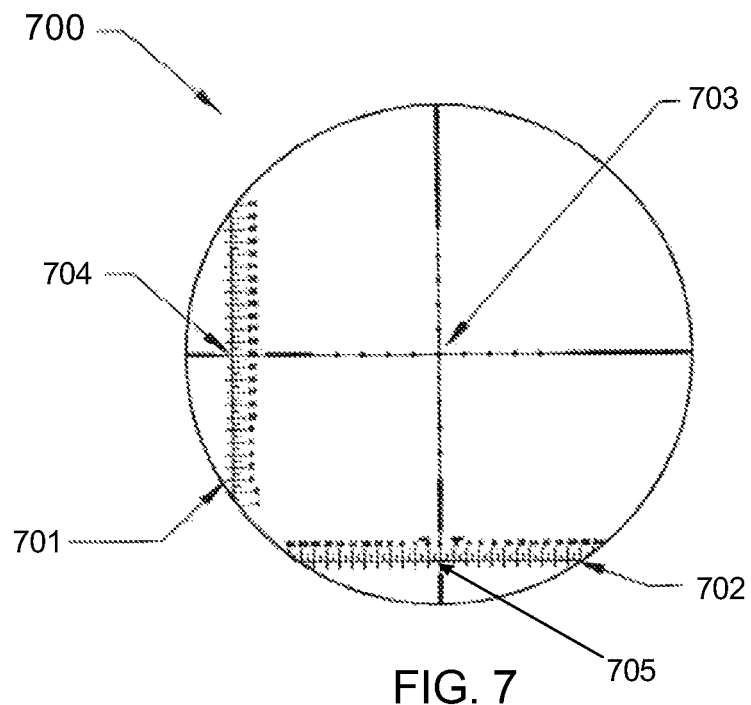
FIG. 7 depicts a first exemplary reticle view through an optical firearms scope with electronic/digital markers to indicate erector tube assembly movements according to the subject matter disclosed herein.
Figure 8:
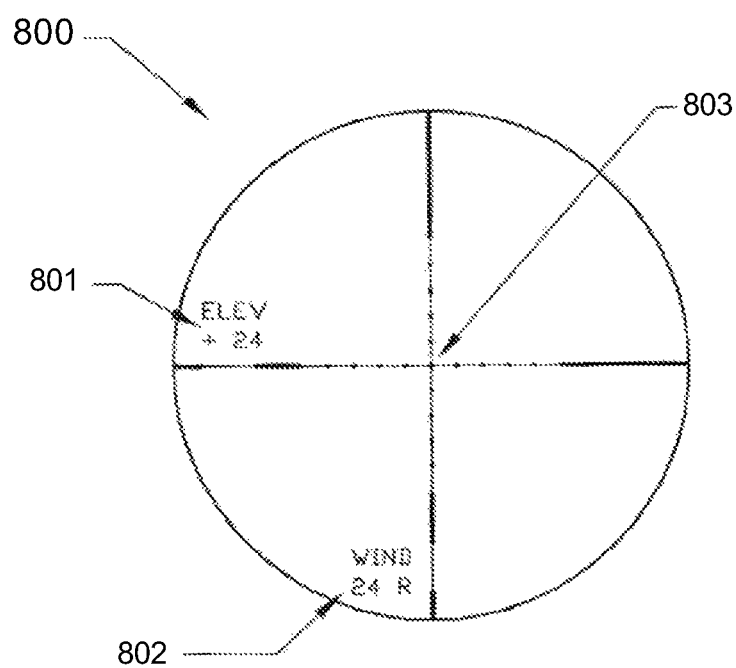
FIG. 8 depicts a second exemplary reticle view 800 through an optical firearms scope with electronic/digital markers to indicate erector tube assembly movements according to the subject matter disclosed herein

Erector tube assembly 507 is positioned in a vertical direction (above or below a centered position as viewed in FIGS. 7 and 8) based on one of two techniques. The first technique utilizes a horizontally oriented eccentric cam/shaft (not shown) that is located below erector tube assembly 507 as viewed in FIGS. 6A and 6B. The eccentric cam/shaft is rotated either directly or indirectly (i.e., through a gearing arrangement) by the externally located elevation knob section 502 of MTK 500. As the horizontal eccentric cam/shaft is rotated, a lifting force is applied to the bottom of erector tube assembly 507, thereby raising the internal aiming point (dot reticle or cross hair as shown in FIGS. 7 and 8). It should be understood that a spring-pressure counter force is applied in a well-known manner to the top of erector tube assembly 507 by a spring (not shown). It should also be understood that the horizontal eccentric cam/shaft could also be configured to be above erector tube assembly 507 as viewed in FIGS. 6A and 6B. Accordingly, for this alternative configuration, the spring-pressure counter force would be applied to the bottom of erector tube assembly 507.

The second technique for positioning erector tube assembly 507 utilizes an elevation pin 508 (FIG. 6A) that is installed on erector tube assembly 507. The elevation pin 508 engages a helical groove 510b (FIG. 6B) that is formed in an elevation drum 510 (having a horizontal axis center of rotation through the center of MTK 500 around elevation hub 509) that is attached to and/or directly or indirectly rotated around elevation hub 509 of MTK 500. Elevation hub 509 is fixed with respect to the body of optical rifle scope 501. As the elevation drum 510 is rotated about its horizontal axis of rotation, the helical groove 510b imparts a lifting force on the elevation pin 508 that, in turn, lifts (or lowers) erector tube assembly 507, thereby raising (or lowering) the internal aiming point (dot reticle or cross hair as shown in FIGS. 7 and 8).

Slip/engagement ring 503 of MTK 500 has a dual purpose. If the slip/engagement ring 503 remains centered (first position) (via a ball detent pressure), the slip/engagement ring 503 is allowed to "free wheel" in a ball-detent position and, consequently, does not impart a rotational adjustment force to either elevation adjustment section 502 or windage adjustment section 504 of MTK 500. If slip/engagement ring 503 is pushed toward elevation adjustment section 502 (second position), slip/engagement ring 503 moves from the ball-detent position, engages with splines, pins, or serrations 510a, or combinations thereof, that are part of elevation drum 510, thereby allowing rotational forces of slip/engagement ring 503 to be imparted to elevation adjustment section 502. If the force pushing slip/engagement ring 503 toward elevation adjustment section 502 is released, spring pressure provided by a spring (not shown) returns slip/engagement ring 503 to the centered ball detent position (first position). If slip/engagement ring 503 is pulled toward windage adjustment section 504 (third position), slip/engagement ring 503 moves from the ball-detent position, engages with splines, pins, or serrations 515a, or combinations thereof, that are part of windage drum 515, thereby allowing rotational forces of slip/engagement ring 503 to be imparted to windage drum 515 and windage helix ring 514. As the helix cut 514b of the windage helix ring 514 rotates around the windage adjustment pin 512, the pin moves to the left or right thereby moving the erector tube assembly 507 to the left or right. Rotation of the windage adjustment section 504 can also move the erector tube assembly 507 with screw threads in a well known manner. If the force pulling slip/engagement ring 503 towards windage adjustment section 504 is released, spring pressure provided by a spring (not shown) returns slip/engagement ring 503 to the centered ball detent position (first position). Automatic return to a "centered position" may or may not be provided dependent on design. As retainer cap 516 is retained to the elevation adjustment hub 509 in a fixed manner and the slip/engagement ring 503 is allowed to slip or "free wheel" around the elevation adjustment hub 509, any inadvertent contact with the MTK will not cause unwanted adjustment of the windage or elevation settings.

Zeroing of adjustment sections 502 and 504 to match bullet impact locations can be accomplished using set screws or spring-loaded pins in a well-known manner. Datum (bottom stop) positions can also be provided in a well-known manner as depicted in FIGS. 5 and 6 to allow alignment of the "zero" digit of the index scale to the fixed "datum" mark on the optical rifle scope 501.

FIGS. 5, 6A and 6B also depict exemplary embodiments of a parallax adjustment knob 505, and an illuminated reticle knob 506. One exemplary embodiment of a parallax adjustment knob 505 operates in a well-known manner to adjust parallax of optical rifle scope 501, but is positioned at the top of the rifle scope to allow adjustment by the operator with a minimum of body movement while in the shooting position. One exemplary embodiment of illuminated reticle knob 506 provides user-selected illumination of a reticle (internal aiming point (dot, post, cross hair, or custom pattern)) of optical rifle scope 501, but is positioned at the right side of the scope due to the infrequency of use. Both parallax adjustment knob 505 and illuminated reticle knob 506 can be combined into one unit or separate units and be optionally included with optical rifle scope 501.

The exemplary embodiment of MTK 500 depicted in FIGS. 5, 6A and 6B is configured for left-handed operation on an optical rifle scope. It should be understood that MTK 500 and optical rifle scope 501 could be configured for either right-handed or left-handed operation in the field.

The exemplary embodiment of MTK 500 depicted in FIGS. 5, 6A and 6B show the portions of elevation adjustment section 502 and windage adjustment section 504 on which the calibration markings are visible and accessible to be touched. In an exemplary alternative embodiment, one or both of the elevation adjustment section 502 and the windage adjustment section 504 could be configured to be recessed with respect to the external diameters of slip/engagement ring section 503 and an end of MTK 500 that is distal to optical rifle scope 501, thereby reducing the ability to contact elevation adjustment section 502 and windage adjustment section 504. In another alternative embodiment, one or both of the elevation adjustment section 502 and the windage adjustment section 504 could be covered with a suitable transparent protective covering so that a user can readily observe the calibration marking for an adjustment setting. In yet another alternative embodiment, one or both of the elevation adjustment section 502 and windage adjustment section 504 could be covered with a protective covering that comprises a window or an aperture through which a user can readily observe the calibration marking for an adjustment setting.

It is common practice for rifle/pistol scopes to have elevation, windage and parallax/focus adjustment turret knobs mounted to the outside of the scope. The rotation of the knobs advances or retracts a threaded member, or in the case of the exemplary MTK 500 a windage adjustment pin 512 or elevation adjustment pin 508 that repositions a tube assembly (erector lens assembly tube) to align the point of aim with the intended point of bullet impact.

It is also common practice in the firearms optics industry to have index/calibration marks on the knob assembly and a fixed index mark on the scope body to give the user a point of reference for rotational movements. It is also normal practice for the user to "zero" the scope prior to normal use. To "zero" the scope the user chooses a distance where the bullet point of impact will coincide with the point of aim. This practice is accomplished by shooting the firearm at the chosen distance and measuring the distance of separation of both points. The scope aiming point adjustment knobs (windage and/or elevation) are adjusted a specific amount to make both points coincide. The firearm is again fired to verify that the adjustment of the scope aiming point adjustment knobs was adequate to have both points coincide. The knobs are then loosened from the internal mechanical assembly to align the "zero" index mark on the rotating knob with the fixed index mark on the scope body. Based on the aligning of the two marks the scope can be adjusted during use and returned to the "zero" or base setting where the point of aim and point of bullet impact are aligned with one another.

There are times during use when the index marks on the outside of the scope are not readily visible, for example, at night. There are other times when the operator (or shooter or marksman) does not want to lose sight of the target through the scope by looking at the index marks. The subject matter disclosed herein provides internal adjustable scales 517 and 518 (shown in FIG. 6A) that can be aligned with the reticle ("cross hair", "dot", or custom style) or a type of rotational position indicators 511 and 513 (shown in FIG. 6A) to indicate the rotary position of the optical point of aim adjustment knobs to give the relative position of the reticle without having to check the index marks on the outside of the scope. In one exemplary embodiment, internal scales 517 and 518 are fixed to the body of optical rifle scope 501 and comprise a transparent portion on which a scale has been etched or formed. As the position of erector tube 507 is adjusted by elevation adjustment section 502 and/or windage adjustment section 504, the relative position of the reticle as measured by the scales can be viewed through the reticle. See, for example, FIG. 7. In another exemplary embodiment, rotational position indicators 511 and 513 are respectively fixed to elevation drum 510 and windage drum 515, and their rotation position is sensed in a well-known manner, such as optically and/or electrically. The sensed rotational position of rotation position indicators 511 and 513 is then processed in a well-known manner, such as by, but not limited to, a microcontroller, and displayed as viewed through the reticle. See for example, FIG. 8. The subject matter disclosed herein provides an operator an advantage of making or verifying sight changes without dismounting the rifle to look at the external index marks on the rotating knob and fixed index mark. In one exemplary embodiment, separate adjustable markers are added to indicate the correct sight settings or direct movement of the erector tube assembly 507 for specific user designated distances. In an alternative exemplary embodiment, the rotational movement of the adjustment knobs or the direct movement of the erector tube assembly 507 is indicated by electronic or digital numerals in the field of view within the optical firearms scope.

FIG. 7 depicts a first exemplary reticle view 700 through an optical firearms scope with electronic/digital markers to indicate erector tube assembly movements according to the subject matter disclosed herein. An adjustable numeric marker 701 for elevation position of the internal point of aim (POA) 703 is shown towards the left of the reticle view. The elevation setting for the point of aim can be read at 704. An adjustable numeric marker 702 for lateral movement (windage) of the internal point of aim 703 is shown towards the bottom of the reticle view. The windage setting for the point of aim can be read at 705. Markers 701 and 702 can be "zeroed" at any point of adjustment knob rotational position or erector tube assembly elevation of windage position.

FIG. 8 depicts a second exemplary reticle view 800 through an optical firearms scope with electronic/digital markers to indicate erector tube assembly movements according to the subject matter disclosed herein. As digital display 801 for elevation position of the internal point of aim 803 is shown towards the left of the reticle view shown. A digital display 802 for lateral movement (windage) of the internal point of aim 803 is shown towards the bottom of the reticle view shown. Display outputs 801 and 802 can be "zeroed" at any point of adjustment knob rotational position or erector tube assembly elevation of windage position.

It should be understood that one exemplary embodiment of the reticle with internal adjustment readings provides variable illumination, such as described in connection with illuminated reticle knob 505, shown in FIGS. 5, 6A and 6B. Additionally, it should be understood that the internal adjustment reading reticle depicted in FIGS. 7 and 8 could be used in an optical rifle scope that uses separate knobs for adjusting elevation and windage. Further still, it should be understood that the particular scales shown as an internal adjustment reading could vary depending on the application. It should also be understood that the internal scales to indicate adjustment settings can be numerically indicated with liquid crystal displays (LCD) or light emitting diodes (LED) or other electronically controlled methods.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A turret knob for independently controlling two orthogonal optical adjustments of an optical scope, comprising:
    a first adjustment member adjustably positionable about an axis of rotation to adjust an optical adjustment of the optical scope in a first direction;
    a second adjustment member adjustably positionable about the axis of rotation to adjust the optical adjustment of the optical scope in a second direction, the second direction being orthogonal to the first direction; and
    a slip/engagement member positioned between the first adjustment member and the second adjustment member along the axis of rotation, the slip/engagement member being movable between a first position and a second position and a third position along the axis of rotation, in the first position the slip/engagement member does not engage the first adjustment member or the second adjustment member, in the second position the slip/engagement member engages the first adjustment member to rotatably adjust the first adjustment member about the axis of rotation as the slip/engagement member is rotated about the axis of rotation and does not engage the second adjustment member, and in the third position the slip/engagement member engages the second adjustment member to rotatably adjust the second adjustment member about the axis of rotation as the slip/engagement member is rotated about the axis of rotation and does not engage the first adjustment member.

2. The turret knob according to claim 1, wherein the first adjustment member comprises a drum member that engages the slip/engagement member if the slip/engagement member is positioned in the second position of the slip/engagement member.

3. The turret knob according to claim 2, wherein the drum member of the first adjustment member and the slip/engagement member engage each with at least one spline, pin, or serration, or combinations thereof.

4. The turret knob according to claim 2, further comprising a sensor capable of sensing a rotary position of the first adjustment member, a sensor capable of sensing a rotary position of the second adjustment member, or a combination thereof; and
    a reticle comprising a display of the sensed rotary position of the first adjustment member, the sensed rotary position of the second adjustment member, or a combination thereof.

5. The turret knob according to claim 4, wherein the display comprises an adjustable numeric marker or a digital display of the sensed rotary position of the first adjustment member, the sensed rotary position of the second adjustment member, or a combination thereof.

6. The turret knob according to claim 1, wherein the second adjustment member comprises a drum member that engages the slip/engagement member if the slip/engagement member is positioned in the third position of the slip/engagement member.

7. The turret knob according to claim 6, wherein the drum member of the second adjustment member and the slip/engagement member engage each with at least one spline, pin, or serration, or combinations thereof.

8. The turret knob according to claim 1, further comprising a sensor capable of sensing a rotary position of the first adjustment member; and
    a reticle comprising a display of the sensed rotary position of the first adjustment member.

9. The turret knob according to claim 8, wherein the display comprises an adjustable numeric marker or a digital display of the sensed rotary position of the first adjustment member.

10. The turret knob according to claim 1, wherein the first optical adjustment adjusts the optical scope in a vertical direction; and
    wherein the second optical adjustment adjusts the optical scope in a horizontal direction.

11. The turret knob assembly according to claim 1 wherein the slip/engagement member is spring biased toward the first position.

12. The turret knob assembly according to claim 11 wherein the first position is located along the axis of rotation between the second and the third positions, and the slip/engagement member is manually slideable away from the first position in opposite directions along the axis of rotation to alternately engage with the respective first and second adjustment members.

13. An optical scope, comprising:
    an optical pathway of the optical scope capable of being optically adjusted in two dissimilar characteristics;
    a first adjustment member supported adjacent the optical pathway for controlling a first adjustment characteristic of the optical pathway in response to a rotational adjustment force; and
    a second adjustment member supported adjacent the optical pathway for controlling a second adjustment characteristic of the optical pathway in response to a rotational adjustment force; and a slip/engagement member positioned in a free-wheeling first position between the first adjustment member and the second adjustment member wherein the slip-engagement member does not impart a rotational adjustment force to either of the first adjustment member or the second adjustment member, the slip/engagement member being movable from the free-wheeling first position into alternating engagement with the first and second adjustment members to rotatably adjust the respective optical adjustment characteristics of the optical pathway through a common interface.

14. The optical scope according to claim 13, wherein the first and second adjustment members are adjustably positionable about an axis of rotation, wherein the slip/engagement member is movable from the disengaged first position to a second position along the axis of rotation, in the second position of the slip/engagement member the slip/engagement member engages the first adjustment member, and wherein the first adjustment member comprises a drum member that engages the slip/engagement member when the slip/engagement member is moved to the second position of the slip/engagement member.

15. The optical scope according to claim 13, wherein the first and second adjustment members are adjustably positionable about an axis of rotation, wherein the slip/engagement member is movable from the disengaged first position to a third position along the axis of rotation, in the third position of the slip/engagement member the slip/engagement member engages the second adjustment member, and wherein the second adjustment member comprises a drum member that engages the slip/engagement member when the slip/engagement member is moved to the third position of the slip/engagement member.

16. The turret know assembly according to claim 15 wherein the free-wheeling first position is located along the axis of rotation between the second and the third positions, and the slip/engagement member is manually slideable away from the free-wheeling first position in opposite directions along the axis of rotation to alternately engage with the respective first and second adjustment members.

17. The optical scope according to claim 13, wherein the first optical adjustment adjusts the optical scope in a vertical direction; and
wherein the second optical adjustment adjusts the optical scope in a horizontal direction.

18. The turret knob assembly according to claim 13 wherein the slip/engagement member is spring biased toward the free-wheeling first position.

19. A turret knob for controlling two orthogonal optical adjustments of an optical scope, comprising:
a first adjustment member adjustably positionable about an axis of rotation of the turret knob to adjust an optical adjustment of the optical scope in a first direction;
a second adjustment member adjustably positionable about the axis of rotation of the turret knob to adjust the optical adjustment of the optical scope in a second direction, the second direction being orthogonal to the first direction,
the first and second adjustment members being independently adjustable about the axis of rotation of the turret knob; and
a slip/engagement member spring biased toward a free-wheeling home position between the first and second adjustment members, the slip/engagement member manually slideable in opposite directions along the axis of rotation into alternating operative engagement with the respective first and second adjustment members, the slip/engagement member configured to alternately impart rotational movement to the first and second adjustment members through a common interface.

20. The turret knob assembly according to claim 19, further comprising a sensor configured to sense a rotary position of the first adjustment member, a sensor configured to sense a rotary position of the second adjustment member, or a combination thereof; and
a reticle within the optical scope comprising a display of the sensed rotary position of the first adjustment member, the sensed rotary position of the second adjustment member, or a combination thereof.

* * * * *